United States Patent [19]

Schneider

[11] 4,390,151
[45] Jun. 28, 1983

[54] AIRCRAFT SKI MOUNTING ASSEMBLY

[76] Inventor: Richard J. Schneider, 20 Malaspina Dr., Eagle River, Ak. 99577

[21] Appl. No.: 236,205

[22] Filed: Feb. 20, 1981

[51] Int. Cl.³ .......................................... B64C 25/52
[52] U.S. Cl. ................................ 244/108; 180/183; 280/9; 280/7.14; 280/28
[58] Field of Search ................... 244/105, 108, 100 R, 244/101; 280/7.12, 7.14, 8, 13, 9, 11, 10, 21 A, 25, 28; 180/5 R

[56] References Cited

U.S. PATENT DOCUMENTS

| | | | |
|---|---|---|---|
| 2,106,934 | 2/1938 | Saulnier | 244/108 |
| 2,108,962 | 2/1938 | Ferrier | 244/108 |
| 3,128,065 | 4/1964 | Landes | 244/108 |
| 3,967,692 | 7/1976 | Hoffman | 244/108 |
| 4,291,892 | 9/1981 | Berthold et al. | 244/108 |

FOREIGN PATENT DOCUMENTS

| | | | |
|---|---|---|---|
| 195275 | 1/1958 | Austria | 280/9 |
| 732538 | 3/1943 | Fed. Rep. of Germany | 244/108 |

Primary Examiner—Galen L. Barefoot
Attorney, Agent, or Firm—William B. Walter

[57] ABSTRACT

A ski mounting assembly for an aircraft landing gear having a ski with a pedestal attached to it to be placed on each side of the landing gear wheel and fork, an extended wheel axle to serve as an axle for the wheel, a mounting for the wheel in the landing gear fork and to serve as a pivotable support for the ski by extending through journals in the ski pedestals, a ski attitude control arm pivotably mounted on one end of the extended wheel axle and provided with a clamp to secure the ski attitude control arm to the landing gear fork, a stop attached to the ski attitude arm so as to act against the ski to limit the downward motion of the ski nose and a spring acting between the ski and the ski attitude control arm to urge the ski against the stop.

4 Claims, 6 Drawing Figures

AIRCRAFT SKI MOUNTING ASSEMBLY

BACKGROUND OF THE INVENTION

This invention relates particularly to the mounting of a tail ski onto a light airplane. A typical tail ski installation according to Federal Air Regulation (F.A.R.) 43-13-2 has a fixed penetration ski which is mounted on the tail wheel, a pedestal on each side of the ski being pivotably secured to the tail wheel by an extension of the wheel axle, the wheel extending partly through the ski. An attitude limiting cable and shock cord connect the ski toe to a point on the fuselage forward of the tail wheel strut. This arrangement severely limits tail ski steering and caster. Another conventional tail ski mounting, that of Aero-Ski of Minneapolis, Minnesota, allows for a full tail wheel ski castering but without allowing any change in attitude of the ski.

The heavy duty aircraft ski of Landes, U.S. Pat. No. 3,128,065 designed primarily for helicopters, has shock cord and safety cable attitude control and as shown, swivel is limited only by the scissors linkage of the non-rotative landing gear fork. The shock cords and safety cables attached to the toe and heel of the ski connect to an attachment ring or eye bolt on a ski bungee bracket added to the oleo piston rod or landing gear wheel fork.

The conventional light airplane with a tricycle landing gear has a spring mounted steerable tail wheel with an overload release which allows the tail wheel to swivel around an obstruction. A need has been demonstrated for a simple reliable tail wheel-ski mount for light aircraft which will allow the ski to swivel and also change attitude within the limits of a safety cable and shock cords or springs.

BRIEF SUMMARY OF THE INVENTION

The primary object of this invention is to provide a mounting arrangement for an aircraft ski to a steerable castering tail wheel of a light airplane, which mounting arrangement will not interfere with the rotation of the wheel fork and which mounting will also provide a reliable easily assembled attachment of a ski to a wheel fork or strut with a fixed ski attitude control.

Another object of the invention is to provide a tail wheel-ski kit for light airplanes which will allow simple and reliable mounting of the ski to the tail wheel assembly.

This invention is a ski mount assembly having a ski with pedestals straddling the landing gear wheel and fork or strut, an extended wheel axle pivotably attaching the ski to the landing gear through the pedestals, an arm clamped to the fork or strut and pivotably attached to the ski by the extended axle and a ski attitude control in which a spring acting between the arm and the ski urges the nose of the ski down against a stop connected to the arm.

DETAILED DESCRIPTION OF THE INVENTION

Figure 1:
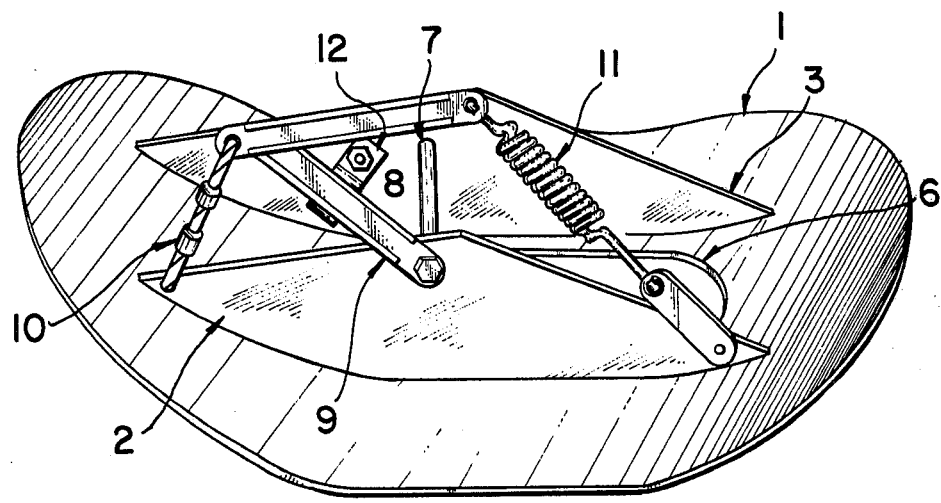
FIG. 1 is a perspective view of the aircraft ski mounting assembly when removed from the aircraft.
Figure 6:
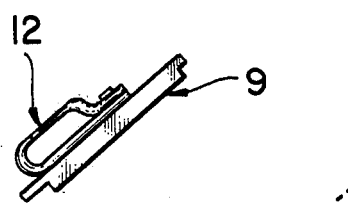
FIG. 6 is a plan view of the mounting arm on the line 6—6 of FIG. 5.
Figure 5:
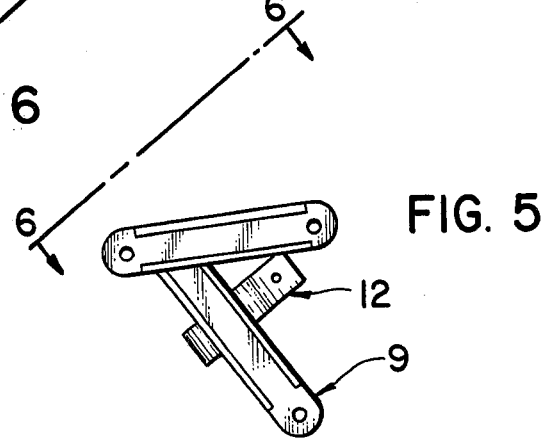
FIG. 5 is a left hand side elevation of the mounting arm of the aircraft ski mounting assembly as removed therefrom.
Figure 2:
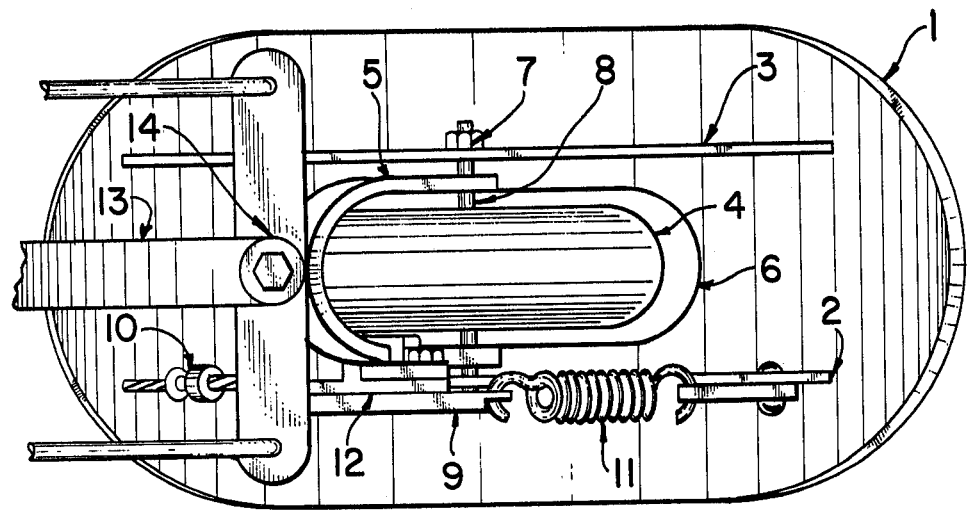
FIG. 2 is a plan view of the ski and mounting as installed on a typical light airplane tail wheel.
Figure 3:
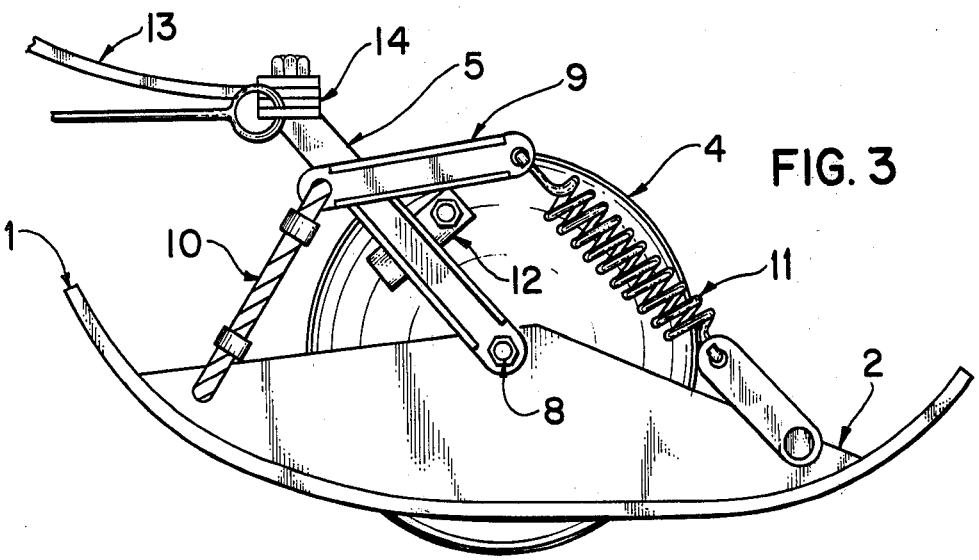
FIG. 3 is a left hand side elevation of the mounting assembly of FIGS. 1-3.
Figure 4:
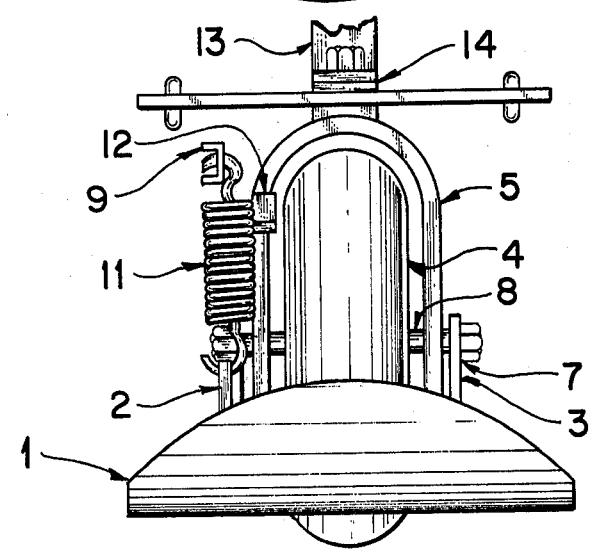
FIG. 4 is a rear elevation of the ski and mounting of FIGS. 1 and 2.

As shown in the drawings, the preferred embodiment of my invention uses a conventional airplane ski 1 in which a pair of parallel pedestals 2 and 3, spaced from each other to accomodate an aircraft landing gear wheel 4 and strut fork 5 therebetween are integral with or attached centrally to the upper surface of the ski 1. This ski 1 has an opening 6 through the bottom of the ski 1 centrally located between the two pedestals 2 and 3 to allow the wheel 4 to extend partially through the ski 1. A journal 7 is provided in each pedestal 2 and 3 to receive an extended axle 8 for the landing gear wheel 4. The extended axle 8 as shown in this embodiment not only provides a support for the wheel 4 and a pivotable attachment for the ski 1 to the landing gear strut fork 5 but it also provides a pivotable attachment for a ski attitude control arm 9 to the ski 1. A safety cable 10 connects the upper end of the arm 9 with the toe of the ski 1 as a stop for a spring 11 which connects the upper end of the arm 9 with the heel of the ski 1. A clamp 12 is welded to the arm 9 near its upper end for attachment to the landing gear strut fork 5.

Installation of the aircraft ski mounting assembly to the airplane landing gear can be accomplished as follows:

1. remove the wheel 4 and its axle,
2. place the landing gear strut fork 5 in the space between the two pedestals with the wheel placed loosely between the arms of the fork,
3. insert the extended axle 8 through the lower end of the arm 9, the journal 7 in pedestal 2, the bearings of wheel 4 and the journal 7 in pedestal 3,
4. install the nuts on the ends of the extended axle 8,
5. slip the clamp 12 over the left hand side of the fork 5, and
6. tighten the clamp 12.

The spring 11 and safety cable 10 hold the ski attitude control arm 9 in a generally upright position about the extended axle 8 as a pivot, in relation to the ski 1. When the ski mount assembly has been attached to the landing gear strut fork 5 by the long axle 8 and arm-to-strut clamp 12, the ski 1 is held in such a position that the nose of ski 1 is higher than the heel of ski 1 for a desirable high lift attitude in flight and so as to limit the possible digging -in to the landing surface. The ski is free to ride over uneven surfaces with the nose of ski 1 rising against the tension of the spring 11.

In the preferred embodiment shown in the drawings, the landing gear is a steerable tail wheel mounted on a light airplane. The landing gear is mounted on the tail of the airplane fuselage by a leaf spring 13. The landing gear strut is a fork 5 which straddles the landing gear wheel 4. The journal 14 for the fork 5 is pivotably attached to the end of the leaf spring 13. A pair of steering arms 15 connected to the fork journal 14 are suitably connected by cables 16 to cockpit controls. A spring release mechanism, now shown, for simplicity, allows the wheel to caster upon an overload.

Although a landing gear strut as shown in the drawings terminates in a fork 5, the concept of my invention can also be applied to a landing gear having a strut terminating in a single column with the wheel supported on a stub axle on one side of the strut and a second simple stub axle installed on the side of the strut opposite the wheel and co-axial with the sheel axle. Thus the attitude control arm 9 could be attached to the strut by the second stub axle and the arm's clamp 12.

The attitude control arm 9 of my invention, by its pin connection on the landing gear axle 8, the clamp 12, positioning of the attachment points of the safety cable 10 and spring 11 on the arm 9 establishes and retains the desired attitude control for the ski 1 each time the ski 1 is mounted on the airplane. Because the arm 9 is secured to the strut 5 at the axle 8, the arm 9 serves as a column to prevent the clamp 12 from sliding down the strut 5 during repeated landings and taxiing of the airplane. While the aircraft ski mounting assembly of my invention has been conceived particularly to meet the requirements of a steerable tail wheel for a light airplane, its ability to establish and retain the desired attitude for flight and landing and to allow the nose of the ski to rise over uneven surfaces without interfering with steering or castering will also be found useful for other applications.

Although in the preferred embodiments shown, the landing gear wheel 4 is to be mounted on the landing gear strut fork 5 with the aircraft ski mounting assembly, my ski mounting assembly may also be used in instances wherein the wheel 4 remains demounted when the ski is so attached to the landing gear.

I claim:

1. An aircraft ski mounting assembly for an aircraft landing gear comprising:
   a. a ski having toe and heel portions, a bottom surface for contact with a landing surface and a pedestal integral with and protruding from the upper surface of the ski;
   b. a ski attitude control arm pivotably attached to said pedestal on an axis transverse to the ski, said arm being operably biased into a generally upright position against a stop limiting the maximum distance between the upper end of the arm and the toe of the ski; and
   c. a landing gear attachment means operably secured to said arm whereby the arm may be attached to the terminal end of an aircraft landing gear in a fixed relationship, the biased pivot between arm and ski pedestal thus acting to allow accomodation of the ski to limited changes of attitude between aircraft and landing surface without the ski toe dropping to dig into the landing surface.

2. An aircraft ski mounting assembly as claimed in claim 1 wherein the pivot for said ski attitude control arm may be an extension of the aircraft landing gear wheel axle.

3. An aircraft ski mounting assembly as claimed in claim 1 also comprising a replacement axle for the landing gear wheel for said aircraft, said replacement axle being sufficiently long to extend through said pivot point of said ski attitude control arm whereby the landing load on said ski will be transferred to the landing gear through the replacement axle in shear.

4. An aircraft ski mounting assembly as claimed in claim 1 wherein said ski also comprises a second pedestal attached to the ski upper surface parallel to and spaced sufficiently from the other pedestal to accomodate an aircraft landing gear wheel and strut therebetween, and wherein said assembly also comprises a replacement axle for the landing gear wheel for said aircraft, said replacement axle being sufficiently long to extend through said pivot point of said ski attitude control arm and each of the pedestals whereby said ski is operably attached to said landing gear strut by the replacement axle as a pivot.

* * * * *